United States Patent Office 2,816,782
Patented Dec. 17, 1957

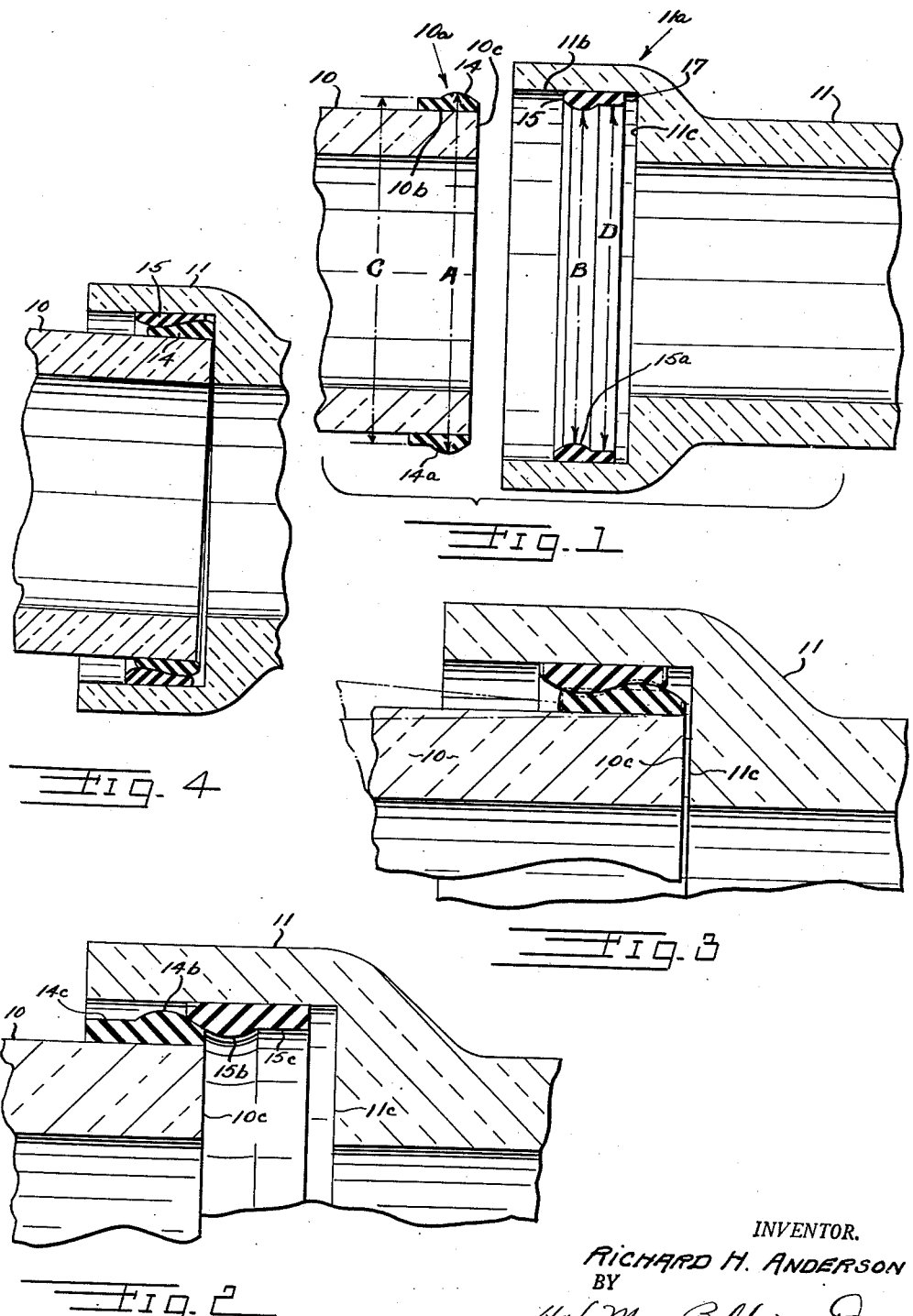

2,816,782

RESILIENT TOROIDAL PUSH-TYPE PIPE JOINT

Richard H. Anderson, Dover, Ohio, assignor to The Robinson Clay Product Company, Akron, Ohio, a corporation of Maine Application April 26, 1955, Serial No. 503,875

7 Claims. (Cl. 285—345)

This invention relates to improvements in a pipe joint and more particularly to a toroidal or annular, axial-push-type pipe joint.

One of the objects of the present invention is to provide a pipe joint comprising two coacting resilient annular members with each being of integral construction to provide both a positive locking action against disassembly and a sealing action against leakage and tree root entry.

A further object of the present invention is to provide a pipe joint that has greatest resistance to assembly during the first portion of the assembly operation and will snap into locked position to clearly indicate that a good joint has been effected.

A further object of the present invention is to provide a pipe joint that permits considerable misalignment between the pipes, will maintain this misaligned position between the pipes, and will seal effectively to prevent leakage in this misaligned position as long as annular engagement exists between the component members of the joint.

A further object of the present invention is to provide a pipe joint constructed for easy assembly; for resisting disassembly; and for permitting disassembly, when necessary, for replacement or repair without destroying the joint construction so that the joint members can be later reassembled with locking and sealing automatically occurring.

A further object of the present invention is to provide a pipe joint having at least two annular and axially spaced sealing zones to doubly assure against leakage and to permit substantial misalignment of the pipes while preventing leakage.

A further object of the present invention is to provide a pipe joint characterized by its structural simplicity, economy of manufacture, advantageous use characteristics, ease of assembly, automatic locking and sealing action, and resistance to disassembly.

Other features of this invention reside in the arrangement and design of the parts for carrying out their appropriate functions.

Other objects and advantages of this invention will be apparent from the accompanying drawings and description and the essential features will be set forth in the appended claims.

In the drawings:

Fig. 1 is a longitudinal, central sectional view through a spigot and bell pipe end having the coactable pipe joint annular members secured thereto;

Fig. 2 is an enlarged sectional view of the upper half of Fig. 1 with the joint members positioned for assembly by an axial push on the pipes;

Fig. 3 is a sectional view, similar to Fig. 2, but with the joint in fully assembled position, the pipes being shown in coaxial position in solid lines and one pipe being shown in a misaligned position in dot-dash line; while Fig. 4 is a sectional view with the pipes tilted from the coaxial position.

While this invention might be adapted to various types of uses, I have chosen to show the same as applied to the spigot and bell ends of conventional sewer pipes.

The pipe joint of the present invention is adapted to join in telescopic assembly pipes 10 and 11. These pipes may be made of clay, cement, asbestos cement, cast iron, stoneware, chemical porcelainware, drain tile, vitrified tile, etc. Pipe 10 has a spigot end 10a having a peripheral surface 10b of circular cylindrical form and an end surface 10c extending generally transverse to the axis of the pipe, while pipe 11 has a bell or socket end 11a having a bore surface 11b cylindrical in form and a bottom surface or shoulder 11c extending generally transverse to the axis of the pipe. The spigot end 10a, being of smaller diameter, telescopically enters for assembly into the bell end 11a of larger diameter, and in the assembled position shown in Fig. 3 transversely extending surfaces 10c, 11c are axially aligned.

The pipe joint includes two annular or toroidal members 14, 15 for facilitating the joining of complementary end portions of pipes by telescopically inserting one within the other in the manner shown in the drawings.

These members 14, 15 are formed of suitable material. I find that a satisfactory, joint forming, flexible material is the type of material (disclosed in my copending U. S. patent application, filed August 24, 1953, entitled "Plastisol Pipe Joint and Method of Forming Same," Serial No. 376,195) generally known as polyvinyl chloride plastisol. A plastisol is a mixture of resins and plasticizers which can be converted to continuous films by the application of heat. To the basic material, polyvinyl chloride powder having the formula $(CH_2=CHCl)_n$, are added materials called plasticizers, which render the finished material flexible and resilient. Representative plasticizers useful for my purpose are butyl benzyl phthalate, cresyl phenyl phosphate, alkyl aryl phosphate, blended alcohol (average 8 carbon) phthalate, Di-2-ethylhexyl phthalate, aromatic hydrocarbon condensate, by which I mean a mixture of alkylated polycyclic aromatic hydrocarbons in which 3- and 4-ring compounds predominate, or methyl abietate. These plasticizers make the powdered polyvinyl chloride partially go into solution and give the material a semi-liquid form with a viscosity of from 1,000 to 10,000 centipoises. Where cold weather flexibility is important, I prefer to use plasticizers such as dioctyl adipate, dioctyl sabecate and dioctyl oleate since these keep the durometer hardness from rising too fast at low temperatures. To this mixture I prefer to add fillers to cheapen the mix for economic use, such fillers being, for example, finely ground silica (to pass 150 mesh), barium sulphate, coke, calcium carbonate, starch, or clay having thixotropic quality.

To make the above mixture heat stable, materials such as lead stearate; barium cadmium compounds; tin cadmium compounds; dibasic lead phosphite; hydrous tribasic lead sulphate; tetra ethyl lead; numerous other lead bearing compounds; and organic compounds well-known in the industry containing tin, barium, cadmium, and zinc alone or in combination may be used.

The above-mentioned plastisol in liquid form can then be poured into open top molds without the use of pressure, and it is fluid enough to fill up the die impression exactly. On the application of heat in the range of 250 to 425 degrees Fahrenheit, the mass fuses and becomes a solid mass which on cooling is tough flexible material with elastic properties.

Some typical compositions useful in forming my polyvinyl-chloride-plastisols are as follows:

A

| | Parts by weight |
|---|---|
| Polyvinyl chloride powder | 100 |
| Barytes ($BaSO_4$)—100 mesh | 55 |
| Aromatic hydrocarbon condensate | 29 |
| Blended alcohol phthalate | 30 |
| Tribasic lead sulphate | 3 |

B

| | Parts by weight |
|---|---|
| Polyvinyl chloride powder | 100 |
| Silica sand—150 mesh | 55 |
| Aromatic hydrocarbon condensate | 34 |
| Di-2-ethylhexyl phthalate | 35 |
| Tetra ethyl lead | 5 |

C

| | Parts by weight |
|---|---|
| Polyvinyl chloride powder | 100 |
| Silica sand | 100 |
| Di-2-ethylhexyl phthalate | 70 |
| Tetra ethyl lead | 3 |

These compositions are inert to various chemicals, inexpensive, flexible and resilient, and may be cast to small dimensional tolerance so that they are ideal for this usage.

The great advantage of the above mentioned polyvinyl chloride plastisols for use with my invention resides in their ability to be gravity molded with no pressure so as to be bonded directly to the pipe surface.

In the type joint disclosed, members 14 and 15 are permanently bonded to their respective pipes when each member is formed by priming the pipe surface and pouring the liquid material between a suitable die and the associated primer-coated pipe surface so that inner member 14 will be carried by the peripheral surface 10b of the spigot end and the outer member 15 will be carried by the bore surface 11b of the bell end during assembly of the pipe point by progressive movement from the Fig. 1 to the Figs. 2 and 3 positions.

Members 14 and 15 have respectively formed thereon an annular peripheral surface 14a and an annular bore surface 15a with each being diametrically dimensioned so that all the laterally aligned points on the surfaces of the members in the joint assembled position of Fig. 3 have diametrical interference with each other to provide the many advantages hereinafter disclosed.

Positive locking means is provided for resisting axial disassembly of the pipes after they are assembled into the Fig. 3 position. Annular surfaces 14a, 15a have outwardly and inwardly directed annular projections 14b and 15b respectively of annular, pump-like form adapted to coact together in a locking manner to prevent disassembly from the Fig. 3 position. Each of these projections is symmetrical about a transverse central plane, outwardly convex, and of uniform radius of curvature for ease of assembly and for permitting disassembly when necessary. The opposite, convex, side surfaces of each projection, on opposite sides of this transverse plane passing through the peak thereof extend away from the plane toward the base to provide smoothly sloping sides on opposite sides of the peaks to provide these functions. Although these projections are shown of uniform convex radius, other shapes readily suggest themselves to one skilled in the art for providing one or more of the advantages mentioned herein. Wherever in the specification and claims I have referred to the projections as "convex," I intend to cover a projection having a central peak and substantially smoothly sloping sides extending axially in opposite directions from the peak. Fig. 2 discloses that these projections 14b, 15b are located on the entry ends or the adjacent ends of members 14, 15 when the pipes are in the preassembled position shown in Fig. 2. Also, the inwardly extending projection 15b is spaced a substantial distance farther from bottom surface 11c than the outwardly extending projection 14b is spaced from the end surface 10c of the spigot end.

These annular projections 14b, 15b are dimensioned to have diametrical interference to provide a positive locking action against an axial disassembly force. The amount of interference must be carefully regulated not only to provide the locking action but also to permit ease of entry under all conditions. Since the plastisol is thermoplastic, its resistance to deformation will change with temperature. The interference must be so chosen that the joint will have self-locking ability at a high temperature, when self-locking ability is at a minimum, and will permit joint assembly at a low temperature, when the resistance to deformation is a maximum.

Means is also provided for sealing the pipes against leakage in the final assembly position shown in Fig. 3. The annular surfaces 14a, 15a have integrally formed with the annular projections, generally circular cylindrical sealing surfaces 14c, 15c respectively with the annular projections 14b, 15b extending respectively above these sealing surfaces 14c, 15c and being spaced axially therefrom. Hence, in the assembled position of Fig. 3, the projections and sealing surfaces coact to seal against leakage.

Interference also exists between each sealing surface and its laterally aligned projection forming the mating sealing surface thereof in the assembled position of Fig. 3. Hence, when in this assembled position, all laterally aligned points on the surface 14a, 15a have diametrical interference with each other so as to provide substantially full contact along the full axial length of annular surfaces 14a, 15a from the right end of member 15 to the left end of member 14. However, less interference between the surfaces and/or different flexibility of the members will still provide adequate sealing action because two annular sealing zones will exist, one at the peak of each of the projections 14b, 15b to provide double sealing.

Progressive assembly of the pipes from the Fig. 2 to the Fig. 3 positions is easily accomplished. The lead ends of projections 14b, and 15b form an entry taper for self-aligning the joint as the pipes are brought in to the preassembly position shown in Fig. 2. This taper is formed by having the curve of these projections 14, 15 respectively extend inwardly beyond the diameter of surface 14c and outwardly beyond the diameter of surface 15c. The smooth convex, uniform and symmetrical curved outline of projections 14b and 15b as well as the circular cylindrical form of surfaces 14c, 15c permits easy assembly. Only an axial push is required to assemble the pipe joints. This may be provided by a crowbar for pushing the new pipe section into the pipe line. If great resistance to entry is encountered or if the pipe line is to be used only for a low pressure system, the annular surfaces 14a, 15a may be lubricated with oil or water to promote easy entry of the spigot end into the socket. As the substantially rigid pipes 10, 11 are moved axially toward each other with flexible member 14, 15 carried rigidly with these respective pipes, the joint members 14, 15 move from the Fig. 2 to the Fig. 3 position when an axial push is exerted so as to overcome the diametrical interference between the projections and at least one projection flexes past the other into the axially spaced apart, positively locked position in Fig. 3. As the flexible projections move across each other and across their respective cylindrical sealing surfaces, they exert a wiping action to remove any foreign matter from the surfaces that might interfere with the seal such as grit, mud, cinders, etc., so that a good seal will be effected. Also, a greatest resistance occurs as the projections move past each other during the initial assembly; after the projections pass each other, the resistance decreases and the joint snaps into locked position to indicate to the workman that a good joint has been assembled. In the Fig. 3 position, at least two axially spaced apart annular sealing zones are formed by the projections bearing against the cylindrical sealing surfaces laterally aligned therewith. Hence, the joint prevents leakage and prevents disassembly of the pipes by the internal pressure of the fluid within the pipes.

For high pressure installations, the sealing action may be increased by painting the two annular surfaces 14a, 15a with a material which has the property of acting not only as a lubricant during the assembly of the joint, but also as an adhesive when it later sets. This may take the form of a suitable highly evaporating solvent for fused plastisol.

This joint construction provides means for frictionally retaining the pipes locked, sealed, and assembled in any misalignment position up to at least partial disengagement of the annular sealing contact between the members 14, 15. When the pipes are coaxial, as shown in the solid line position in Fig. 3, the spigot pipe end surface 10c is axially spaced from the bell bottom surface 11c. As the pipes 10, 11 are moved into misalignment by having pipe 10 moved clockwise to the upper dot-dash line position in Fig. 3 or the Fig. 4 position, the upper end of surface 10c engages with surface 11c and the pipe 10 pivots thereon so as to cause the inner member 14 to move to a new equilibrium position wherein the tilted position will be frictionally maintained, a double seal will still exist and the pipe joint will be positively locked together. The upper end of member 14 in Fig. 3 will be located farther into the bell and closer to the surface 11c while the lower end of member 14 will be moved away from the surface 11c. As misalignment is increased, the double seal will become a single seal on the lower surface as the projections move toward lateral alignment. Even when the projections pass each other on the lower surface, as misalignment is increased still more, there will be still a substantial zone of annular contact around the periphery of member 14 to provide a sealing action, to frictionally retain the pipes in the misaligned position, and to provide some locking action to resist axial disassembly of the pipes.

An annular space 17 located between member 15 and bell bottom surface 11c is easily formed and has several advantages. The mold to form member 15 is telescoped within bell end 11a and is supported on surface 11c (with pipe 11 up-ended, its axis vertically, and surface 11c extending horizontally) by a gasket (formed of heat resistant rubber-like material, such as sponge rubber, a silicone gasket, etc.) located therebetween of any suitable dimension. After the plastisol has been poured into the mold and member 15 has been cured, the mold may be removed and the sponge rubber stripped out to leave this air gap or space 17. This space permits tilting or misalignment of the pipes with less tendency to disassemble the joint members, creates the illusion of filling more of the annular space of bell end 11a, and allows axial movement of the plastisol of members 14 and 15 when it is being compressed by the entry of the male portion of the joint during assembly, so that the joint will go home easier to the assembled position shown in Fig. 3 for any given amount of interference between surfaces 14a, 15a. This last feature is especially important in colder weather (30°–50° F.) when plastisol becomes harder and more pressure would be required to assemble the joint if this space were not provided.

Although the assembled joint in Fig. 3 resists disassembly, and it is almost impossible to disassemble the pipes by a straight axial pull, the pipes may be disassembled for repair or replacement of a pipe section by tilting the pipes into misalignment sufficiently far until the joint is partially disassembled and then pulling the joint apart. The smooth contours on the annular surfaces 14a and 15a, instead of barbs or an adhesive bond of the prior art, permit disassembly without destroying the joint members 14, 15 so that they again will positively lock and seal and function in the normal manner after reassembly.

Also, the non-tacky character of surfaces 14a, 15a and the opportunity of joining pipes without requiring adhesive to be applied to these surfaces makes joint assembly in the field an easier job.

Although the previously described construction illustrated in the drawings is the preferred construction, alternative constructions readily suggest themselves to one skilled in the art. First, one or both joint members 14, 15 may be cast separate from its associated pipe and adhesively secured thereto instead of being bonded thereto during member manufacture. In either case, the cylindrical surface of each member remote from the annular surface 14a or 15a is secured to its respective pipe prior to joint assembly. Second, the member 14, for example, may be composed of two separate elements axially spaced apart with a gap therebetween when secured to the pipe instead of being integral and with one portion having projection portion 14b and the other having sealing surface portion 14c of annular surface 14a.

A joint for a standard 4" pipe provides these advantages with approximately the following dimensions: space 17 is ¼" long in axial length, radii in the plane of the drawings of projections 14b, 15b are ⅜", joint member 14 is formed in a mold with a 6.020" diameter at the maximum dimension of projection 14b and with a 5.900" diameter forming surface 14c, joint member 15 is formed in a mold with a 5.740" diameter at the minimum diameter of projection 15b and with a 5.860" diameter forming surface 15c, each joint member is about 1" in axial length, and the diameters of pipe surfaces 10b and 11b are approximately 5½" and 6¼" respectively. The preferred material (heretofore designated as composition B) forming joint members 14 and 15 has a durometer hardness of approximately 45 on scale A at 80° F. and 60 on scale A at 32° F., a minimum tensile strength of at least 300 p. s. i., and a minimum ultimate elongation of 100% when loaded in tension. These dimensions provide a diametrical interference between projections 14b, 15b of 0.28" or (6.020−5.740) and between each sealing surface and its mating projecting in Fig. 3 (14, 15b or 14b, 15c) of 0.16" so as to provide respectively a 27.3% compression $$\left(\frac{.28}{(6.25-5.74)+(6.02-5.5)}=27.3\%\right)$$

or deformation as projections 14b, 15b move past each other to provide the positive locking action and resistance to disassembly and a 17.6% compression between the surfaces engaging in Fig. 3 to provide positive sealing.

This ⅜" radius and interferences of 0.16" and 0.28" work equally well on not only 4" but also 6" and 8" pipes.

Experiments have been conducted with pipes having projections 14b, 15b with radii of ⅜" to 1⅝". However, ⅜" radius is preferred because it permits a smaller overall joint length of members 14, 15 in the assembled position of Fig. 3; greater positive locking power of the joint because of the more abrupt rise of the sides of the projections; and greater sealing pressure and larger interferences because the sides of projections 14b, 15b rise more abruptly to a peak.

Experiments have been conducted with diametrical interference between the projections over the range of 0.25"–0.36". This is the practical limit for good joints because at 0.25" the positive self-locking ability is at a minimum at 70°–80° F. and because at 0.36" the joint entry at 30° F. is next to impossible by exertion of reasonable force. This range of interference provides a range of approximately 15–35% compression of the plastisol during assembly and disassembly of the joint.

The interference between the contacting sealing surfaces in Fig. 3 have been studied over the diametrical interference range of .08" to .18". At .08", sealing and root-proofness is at a practical minimum for a satisfactory joint. An interference over .18" would not be practical because as the interference goes up the height of the projections must come down; this would reduce the positive locking ability. This range of interference provides a range of approximately 5-25% compression of the plastisol.

This pipe joint construction has many advantages: (1) the joint is designed not only for easy entry but also for positive self-locking over a wide variation in temperature; (2) projections 14b, 15b give a wiping action during assembly to remove grit, mud, cinders and other foreign material tending to prevent effective sealing; (3) initial entry causes maximum resistance to assembly followed by a snap action to bring the joint home and to indicate by a feel sensation that a good joint has been made; (4) the joint resists disassembly by providing a positive locking action so as to make it almost impossible to disassemble the joint by a straight axial pull; (5) the projections 14b, 15b provide a dual function in providing not only a positive snap lock to keep the joint assembled but also a seal against the opposite sealing surfaces 15c, 14c respectively; (6) at least two axially spaced apart sealing zones are provided at the peaks of projections 14b, 15b to make a leak-proof and root-proof joint but with the sealing contact generally extending continuously throughout substantially the whole axial length of the lateral alignment between members 14 and 15; (7) the pipes may be moved to a position of considerable misalignment but this joint will provide sealing throughout an annular zone, positive locking, and frictional retention of the pipes in this position; (8) the pipes can be disassembled, since they are not usually adhesively secured together, by tilting to a misaligned position and then pulling the pipes apart so that a joint member or pipe section may be repaired or replaced without destroying the sealing or locking properties of either joint member; and (9) each joint member 14 or 15 is of unitary, integral construction always carried by the pipes when they are sold and providing both the locking and sealing functions without requiring additional structure, such as loose rings, sealing compound, adhesive or tacky material, etc.

Various changes in details and arrangement of parts can be made by one skilled in the art without departing from either the spirit of this invention or the scope of the appended claims.

What is claimed is:

1. In a pipe joint for joining a bell end of one pipe with a spigot end of another pipe adapted to enter into said bell end, the combination of a first annular resilient sealing ring secured to the radially inner surface of said bell end and having an uninterrupted annular projection convex radially inwardly and toward the axially outer part of said bell end and said ring having a generally cylindrical sealing surface of greater inside diameter than the peak of said projection and located axially inward from said projection, a second annular resilient sealing ring secured to the radially outer surface of said spigot end and having an uninterrupted annular projection convex radially outwardly and toward the axially outer part of said spigot end and said second ring having a generally cylindrical sealing surface of less outside diameter than the peak of its associated projection and located axially inward from said associated projection, said sealing rings being located relative to the ends of their respective pipes so that the projection of each said ring lies radially opposite the cylindrical sealing surface of the other of said rings when said spigot end enters said bell end to joint-forming position, the diameter of said projections and the resilient material thereof permitting the projections to pass each other as the spigot end telescopes into the bell end, and there being diametrical interference between said projection of each of said sealing rings and the cylindrical sealing surface of the other of said sealing rings when said rings are in joint-forming position, whereby said projections snap past each other as said spigot end moves into said bell end to joint-forming position and thereafter each projection seals against the cylindrical surface radially opposite to it.

2. A pipe joint structure as in claim 1, wherein each of said sealing rings is a unitary structure bonded to its associated pipe.

3. A pipe joint structure as in claim 1, wherein each of said sealing rings is molded in place on its associated pipe end and provides mating surfaces the limiting peripheries of which in sections transverse of its associated pipe lie on substantially concentric circles regardless of non-uniform diameters of the pipe in the joint-forming zone.

4. A pipe joint structure as in claim 1, wherein said sealing rings are so located relative to the ends of their respective pipes that in said joint-forming position the spigot end of one pipe is spaced from the bottom of the bell end of the other pipe, whereby said pipes may be tilted out of axial alignment through a substantial angle.

5. A pipe joint structure as in claim 1, wherein each of said projections of said sealing rings has a uniform radius of curvature.

6. A pipe joint structure as in claim 1, wherein said diametrical interference between a projection of one ring and the cylindrical sealing surface of a mating ring provides approximately 15 to 35 percent compression of the resilient material of said sealing rings.

7. A pipe joint structure as in claim 1, wherein one of said pipes has a bell end and a spigot end, one of said sealing rings secured to one end and a sealing ring similar to said other sealing ring secured to its other end.

References Cited in the file of this patent

UNITED STATES PATENTS

| | | |
|---|---|---|
| 515,627 | Sykes | Feb. 27, 1894 |
| 1,979,470 | Johnston | Nov. 6, 1934 |
| 2,271,936 | Carson | Feb. 3, 1942 |
| 2,327,128 | Renfrew | Aug. 17, 1943 |
| 2,366,067 | Smith | Dec. 26, 1944 |
| 2,445,963 | Montgomery | July 27, 1948 |
| 2,766,054 | Everhart | Oct. 9, 1956 |
| 2,770,476 | Cleverly | Nov. 13, 1956 |